United States Patent
Okamoto et al.

(10) Patent No.: US 12,234,333 B2
(45) Date of Patent: Feb. 25, 2025

(54) WATER-SOLUBLE FILM AND PACKAGE

(71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 659 days.

(21) Appl. No.: 17/359,991

(22) Filed: Jun. 28, 2021

(65) Prior Publication Data
US 2021/0324158 A1 Oct. 21, 2021

Related U.S. Application Data

(63) Continuation of application No. PCT/JP2019/051488, filed on Dec. 27, 2019.

(30) Foreign Application Priority Data

Dec. 28, 2018 (JP) ................. 2018-248287

(51) Int. Cl.
| | | |
|---|---|---|
| C08J 5/18 | (2006.01) | |
| A01N 25/10 | (2006.01) | |
| A01N 25/34 | (2006.01) | |
| B65D 65/46 | (2006.01) | |
| C11D 3/37 | (2006.01) | |
| C11D 17/04 | (2006.01) | |

(52) U.S. Cl.
CPC ........... *C08J 5/18* (2013.01); *A01N 25/10* (2013.01); *A01N 25/34* (2013.01); *B65D 65/46* (2013.01); *C11D 3/3753* (2013.01); *C11D 17/042* (2013.01); *C08J 2329/04* (2013.01)

(58) Field of Classification Search
None
See application file for complete search history.

(56) References Cited

U.S. PATENT DOCUMENTS

| | | | |
|---|---|---|---|
| 4,478,971 | A | 10/1984 | Ballard |
| 7,674,518 | B2 | 3/2010 | Hayakawa et al. |
| 8,927,061 | B2 | 1/2015 | Hikasa et al. |
| 9,908,957 | B2 | 3/2018 | Mori et al. |
| 2003/0114332 | A1 | 6/2003 | Ramcharan et al. |

(Continued)

FOREIGN PATENT DOCUMENTS

| | | |
|---|---|---|
| CA | 3001549 A1 | 10/2017 |
| CN | 1871138 A | 11/2006 |

(Continued)

OTHER PUBLICATIONS

JP2017119434A—EPO Translation (Year: 2017).*

(Continued)

*Primary Examiner* — Kyung S Chang (74) *Attorney, Agent, or Firm* — Morgan, Lewis & Bockius LLP (57) ABSTRACT

Provided are a water-soluble film preferably used for production of a package that has excellent surface gloss and has excellent anti-blocking properties, and a package using the same. A water-soluble film includes a polyvinyl alcohol resin, wherein the water-soluble film has a glossy surface with an average height SRc(G) of 1.8 μm or less and a maximum height SRz(G) of 20 μm or more and 50 μm or less.

20 Claims, 1 Drawing Sheet

(56) References Cited

U.S. PATENT DOCUMENTS

| | | | |
|---|---|---|---|
| 2007/0087171 | A1 | 4/2007 | Hikasa et al. |
| 2009/0291282 | A1 | 11/2009 | Kitamura et al. |
| 2011/0236608 | A1 | 9/2011 | Vavassori Bisutti |
| 2016/0002422 | A1 | 1/2016 | Hochi et al. |
| 2016/0102279 | A1 | 4/2016 | Labeque et al. |
| 2016/0194465 | A1 | 7/2016 | Takafuji et al. |
| 2016/0340456 | A1 | 11/2016 | Mori et al. |
| 2017/0233539 | A1 | 8/2017 | Friedrich et al. |
| 2017/0259975 | A1 | 9/2017 | Yonezawa et al. |
| 2017/0298155 | A1 | 10/2017 | Takafuji et al. |
| 2017/0355938 | A1 | 12/2017 | Lee et al. |
| 2018/0245028 | A1 | 8/2018 | Ookubo et al. |
| 2018/0251613 | A1 | 9/2018 | Hiura et al. |
| 2020/0063076 | A1 | 2/2020 | Hiura |
| 2021/0171882 | A1 | 6/2021 | Tanikawa et al. |

FOREIGN PATENT DOCUMENTS

| | | |
|---|---|---|
| CN | 107746467 A | 3/2018 |
| EP | 0347219 A1 | 12/1989 |
| EP | 3348605 A1 | 7/2018 |
| EP | 3348608 A1 | 7/2018 |
| EP | 3677405 A1 | 7/2020 |
| EP | 3904035 A1 | 11/2021 |
| EP | 3904231 A1 | 11/2021 |
| EP | 3904232 A1 | 11/2021 |
| JP | H06-138321 A | 5/1994 |
| JP | H10-296820 A | 11/1998 |
| JP | 2000296529 A | 10/2000 |
| JP | 2001329130 A | 11/2001 |
| JP | 2002-020507 A | 1/2002 |
| JP | 2002-030162 A | 1/2002 |
| JP | 2002020506 A | 1/2002 |
| JP | 2002-241797 A | 8/2002 |
| JP | 2002-347112 A | 12/2002 |
| JP | 2005-194295 A | 7/2005 |
| JP | 2005179390 A | 7/2005 |
| JP | 2010-155453 A | 7/2010 |
| JP | 2014-016649 A | 1/2014 |
| JP | 2015057629 A | 3/2015 |
| JP | WO2015/118978 A1 | 8/2015 |
| JP | 2016060746 A | 4/2016 |
| JP | WO2016/084836 A1 | 6/2016 |
| JP | 2016-150769 A | 8/2016 |
| JP | 2016-222834 A | 12/2016 |
| JP | WO2016/190235 A1 | 12/2016 |
| JP | WO2017/043505 A1 | 3/2017 |
| JP | 2017-078166 A | 4/2017 |
| JP | 2017-095679 A | 6/2017 |
| JP | 2017-110213 A | 6/2017 |
| JP | 2017-114931 A | 6/2017 |
| JP | 2017-115128 A | 6/2017 |
| JP | 2017-119434 A | 7/2017 |
| JP | 2017-119853 A | 7/2017 |
| JP | 2017-217866 A | 12/2017 |
| JP | WO2018/230583 A1 | 12/2018 |
| JP | 2019-044021 A | 3/2019 |
| JP | WO2019/198683 A1 | 10/2019 |
| WO | 2009/075202 A1 | 6/2009 |
| WO | 2013/146147 A1 | 10/2013 |
| WO | 2014/050696 A1 | 4/2014 |
| WO | 2017/043508 A1 | 3/2017 |
| WO | 2017043514 A1 | 3/2017 |
| WO | WO2017/043509 A1 | 3/2017 |
| WO | 2019/044751 A1 | 3/2019 |

OTHER PUBLICATIONS

International Search Report issued in related International Patent Application No. PCT/JP2019/051488 dated Mar. 24, 2020.
Extended European Search Report issued in related European Patent Application No. 19901491.1 dated Aug. 18, 2022.
Extended European Search Report issued in related European Patent Application No. 19905634.2 dated Aug. 30, 2022.
Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).
Takigawa et al., "Structure and mechanical properties of poly(vinyl alcohol) gels swollen by various solvents," Polymer, 33 (11): 2334-2339 (1992).
Extended European Search Report issued in related European Patent Application No. 19903285.5 dated Aug. 24, 2022.
Extended European Search Report issued in related European Patent Application No. 19905828.0 dated Sep. 14, 2022.
Extended European Search Report issued in related European Patent Application No. 19905635.9 dated Sep. 14, 2022.
Extended European Search Report issued in related European Patent Application No. 19902016.5 dated Aug. 18, 2022.
Extended European Search Report issued in related European Patent Application No. 19901493.7 dated Aug. 24, 2022.
Jang et al., "Plasticizer effect on the melting and crystallization behavior of polyvinyl alcohol," Polymer, 44: 8139-8146 (2003).
Peppas, "Infrared spectroscopy of semicrystalline poly(vinyl alcohol) networks," Die Makromolekulare Chemie, 178 (2): 595-601 (1977) (English abstract only).
Extended European Search Report issued in related European Patent Application No. 19903286.3 dated Aug. 24, 2022.
Extended European Search Report issued in related European Patent Application No. 19905031.1 dated Sep. 1, 2022.
Office Action issued in the U.S. Appl. No. 17/360,098, dated Sep. 27, 2023.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
Office Action issued in Japanese Patent Application No. 2020-562508 (corresponding to U.S. Appl. No. 17/359,952) dated Oct. 4, 2022.
Office Action issued in Japanese Patent Application No. 2020-562509 (corresponding to U.S. Appl. No. 17/359,960) dated Oct. 4, 2022.
Office Action issued in Japanese Patent Application No. 2020-562516 (corresponding to U.S. Appl. No. 17/360,098) dated Oct. 4, 2022.
Office Action issued in Japanese Patent Application No. 2020-562510 (corresponding to U.S. Appl. No. 17/359,991) dated Oct. 25, 2022.
Office Action issued in Japanese Patent Application No. 2020-562513 (corresponding to U.S. Appl. No. 17/360,040) dated Nov. 22, 2022.
Office Action issued in Japanese Patent Application No. 2020-562515 (corresponding to U.S. Appl. No. 17/360,076) dated Sep. 13, 2022.
Office Action issued in U.S. Appl. No. 17/360,040 dated Jul. 7, 2023.
Second Office Action issued in Chinese Patent Application No. 201980086859.X dated Jul. 3, 2023, corresponding to U.S. Appl. No. 17/359,991.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.

(56) References Cited

OTHER PUBLICATIONS

Written opposition on JP Application No. 2020-562508, U.S. Pat. No. 7,240,420, dispatched on Oct. 18, 2023—concise explanation in English attached (corresponding to U.S. Appl. No. 17/359,952).

Notice of reasons for revocation on JP Application No. 2020-562508, U.S. Pat. No. 7,240,420, dispatched on Nov. 15, 2023—concise explanation in English attached (corresponding to U.S. Appl. No. 17/359,952).

Trial and Appeal Decision No. 2020-35529, issued on JP Patent No. 2543748.

Office Action issued in Japanese Patent Application No. 2020-562511 (corresponding to U.S. Appl. No. 17/360,004) dated Jan. 16, 2023.

Office Action issued in Japanese Patent Application No. 2020-562512 (corresponding to U.S. Appl. No. 17/360,018) dated Jan. 16, 2023.

Office Action issued in Chinese Patent Application No. 201980086862.1 (corresponding to U.S. Appl. No. 17/359,952) dated Dec. 5, 2022.

Office Action issued in Chinese Patent Application No. 201980086856.6 (corresponding to U.S. Appl. No. 17/359,960) dated Dec. 27, 2022.

Office Action issued in Chinese Patent Application No. 201980086861.7 (corresponding to U.S. Appl. No. 17/360,040) dated Dec. 7, 2022.

Office Action issued in Chinese Patent Application No. 201980086834.X (corresponding to U.S. Appl. No. 17/360,098) dated Dec. 8, 2022.

Office Action issued in Japanese Patent Application No. 2020-562512 corresponding to U.S. Appl. No. 17/360,018 dated Jun. 20, 2023.

Office Action issued in Chinese Patent Application No. 201980086856.6 corresponding to U.S. Appl. No. 17/359,960 dated Jun. 21, 2023.

Office Action issued in Chinese Patent Application No. 201980086787.9 corresponding to U.S. Appl. No. 17/360,004 dated Apr. 12, 2023.

Office Action issued in Chinese Patent Application No. 201980086844.3 corresponding to U.S. Appl. No. 17/360,055 dated Jun. 8, 2023.

Office Action issued in related Chinese Patent Application No. 201980086843.9 dated Jul. 25, 2022.

Office Action issued in related Chinese Patent Application No. 201980086787.9 dated Aug. 2, 2022.

Office Action issued in the U.S. Appl. No. 17/359,960, dated May 29, 2024.

Office Action issued in the U.S. Appl. No. 17/360,055, dated Apr. 11, 2024.

Office Action issued in the U.S. Appl. No. 17/360,076, dated Feb. 12, 2024.

Office Action issued in the U.S. Appl. No. 17/359,960, dated Feb. 20, 2024.

Office Action issued in the U.S. Appl. No. 17/360,018, dated Mar. 26, 2024.

Office Action issued in the U.S. Appl. No. 17/360,004, dated Mar. 26, 2024.

Office Action issued in the corresponding U.S. Appl. No. 17/360,055, mailed Aug. 27, 2024.

Office Action issued in the corresponding U.S. Appl. No. 17/360,076, mailed Jul. 17, 2024.

Office Action issued in the corresponding U.S. Appl. No. 17/359,952, mailed Sep. 27, 2024.

Non-Final Office Action issued in the corresponding U.S. Appl. No. 17/360,076, dated Oct. 15, 2024.

* cited by examiner

WATER-SOLUBLE FILM AND PACKAGE

TECHNICAL FIELD

The present invention relates to a polyvinyl alcohol resin-containing water-soluble film preferably used for packaging various chemicals and the like and a package using the same.

BACKGROUND ART

In the past, water-soluble films have been used in a wide range of fields, including packaging of various chemicals, such as liquid detergents, pesticides, and germicides, and seed tapes encapsulating seeds, taking advantage of excellent solubility in water.

For water-soluble films to be used for such an application, polyvinyl alcohol resins (hereinafter, may be simply referred to as "PVAs") are mainly used. For the purpose of matting and improvement of slip properties between films, such a film may be provided with uneven surfaces. A method of providing such an uneven shape may be a method where a filler is contained in an aqueous PVA solution to be formed into a film, a method where a film is embossed, and the like (e.g., PTL 1).

PTL 2 describes that, in preparation of a package for chemicals, embossed surfaces or unembossed surfaces are bonded to each other for bonding of a water-soluble film, thereby obtaining a package for chemicals with good appearance properties.

CITATION LIST

Patent Literature

PTL 1: JP 2017-119434 A
PTL 2: JP 2017-110213 A

SUMMARY OF INVENTION

Technical Problem

In recent years, from the perspective of design properties, packages are increasingly expected to have a glossy and excellent quality appearance. In this case, a package is prepared by bonding the more uneven surfaces, such as embossed surfaces, to place the less uneven surface on the front surface side, causing insufficient anti-blocking properties of each package and sometimes deformation or tears of the packages during storage or transport.

It is an object of the present invention to provide a water-soluble film preferably used for production of a package that has excellent surface gloss and has excellent anti-blocking properties and a package using the same.

Solution to Problem

As a result of an intensive examination, the present inventors researched on surface roughness of water-soluble films containing a polyvinyl alcohol resin by focusing on the height of unevenness in areal roughness, not profile roughness such as arithmetic mean roughness Ra that has been investigated in the past, and have found that the above problems were probably achieved by particularly keeping an average height and a maximum height in specific ranges. They made further investigation based on the findings to complete the present invention.

That is, the present invention relates to what follows.
[1] A water-soluble film including a polyvinyl alcohol resin, wherein
the water-soluble film has a glossy surface with an average height $SRc(G)$ of 1.8 μm or less and a maximum height $SRz(G)$ of 20 μm or more and 50 μm or less.
[2] The water-soluble film according to [1] above, wherein a sum $\{SRc(M)+SRc(G)\}$ of an average height $SRc(M)$ of a mat surface and the average height $SRc(G)$ of the glossy surface is 2 μm or more and 6 μm or less.
[3] The water-soluble film according to [1] or [2] above, wherein the average height $SRc(M)$ of the mat surface is 1 μm or more and 5 μm or less.
[4] A package including the water-soluble film according to any one of [1] through [3] above, wherein
the water-soluble film contains a chemical.
[5] The package according to [4] above, wherein the glossy surface is an outer surface.
[6] The package according to [4] or [5] above, wherein the chemical is a pesticide, a detergent, or a germicide.

Advantageous Effects of Invention

According to the present invention, it is possible to provide a water-soluble film preferably used for production of a package that has excellent surface gloss and has excellent anti-blocking properties and a package using the same.

DESCRIPTION OF EMBODIMENTS

The present invention is specifically described below.

A water-soluble film of the present invention contains a polyvinyl alcohol resin (PVA). When average heights (SRc) of both surfaces of the film are measured to define a surface with smaller SRc as a glossy surface, an average height of the glossy surface as $SRc(G)$, and a maximum height thereof as $SRz(G)$, the water-soluble film of the present invention has a glossy surface with $SRc(G)$ of 1.8 μm or less and a maximum height $SRz(G)$ of 20 μm or more and 50 μm or less.

Surface Roughness of Film

In the present invention, an average height SRc and a maximum height SRz are measured in a 200 μm×200 μm area using a laser microscope (e.g., "OLS 3100" manufactured by Olympus Corp.) to be used as indices indicating the surface roughness of the film. The average heights SRc on both surfaces of the film are measured to define the surface with a smaller average height SRc as a glossy surface and the surface with a larger one as a mat surface.

The average height $SRc(G)$ of the glossy surface is 1.8 μm or less, preferably 1.5 μm or less, and more preferably 1.2 μm. $SRc(G)$ in the above range allows the film to have excellent surface gloss on the glossy surface. Meanwhile, the lower limit of $SRc(G)$ is preferably, but not particularly limited to, 0.3 μm or more from the perspective of productivity.

The maximum height SRz(G) of the glossy surface is 20 μm or more and 50 μm or less. SRz(G) in the above range allows the glossy surfaces to have excellent anti-blocking properties to each other. SRz(G) is preferably 25 μm or more. An excessively small SRz(G) may cause the glossy surfaces to have insufficient anti-blocking properties to each other. Meanwhile, the upper limit of SRz(G) is preferably 45 μm or less and more preferably 40 μm or less. An excessively large SRz(G) tends to cause difficulty in achieving both the anti-blocking properties and other kinds of performance, such as appearance.

The average height SRc(M) of the mat surface is preferably 1 μm or more and 5 μm or less. SRc(M) in the above range allows the mat surface to have excellent sealing properties to each other. From the perspective of productivity, SRc(M) is preferably 1.5 μm or more. The upper limit of SRc(M) is more preferably 4.5 μm or less and even more preferably 4 μm or less. An excessively large SRc(M) tends to cause the mat surface to have insufficient sealing properties to each other.

The maximum height SRz(M) of the mat surface is preferably 20 μm or more and 80 μm or less. SRz(M) in the above range facilitates appropriate adjustment of the slip properties of the glossy surface and the mat surface and causes winding creases less likely to occur when the film is wound in a roll. The upper limit of SRz(M) is more preferably 70 μm or less and even more preferably 60 μm or less. Meanwhile, the lower limit is more preferably 30 μm or more.

The sum {SRc(M)+SRc(G)} of the average height SRc (M) of the mat surface and the average height SRc(G) of the glossy surface is preferably 2 μm or more and 6 μm or less. {SRc(M)+SRc(G)} in the above range allows the film to have excellent sealing properties between the glossy surface and the mat surface. In recent years, products have been sold in which two or more different kinds of chemical are enclosed in a multicompartment package prepared by bonding three films. When such a multicompartment package is prepared, the glossy surface and the mat surface have to be bonded. Thus, improvement of the sealing properties is increasingly expected, not only between the glossy surfaces and between the mat surfaces having been investigated in the past, but also between the glossy surface and the mat surface. The upper limit of {SRc(M)+SRc(G)} is more preferably 5 μm or less. Meanwhile, the lower limit is more preferably 2.5 μm or more and even more preferably 3 μm or more.

The sum {SRz(M)+SRz(G)} of the maximum height SRz(G) of the mat surface and the maximum height SRz(G) of the glossy surface is preferably 40 μm or more and 100 μm or less. {SRz(M)+SRz(G)} in the above range allows the slip properties of the glossy surface and the mat surface to be appropriate and thus causes winding creases less likely to occur when the film is wound in a roll. The upper limit of {SRz(M)+SRz(G)} is preferably 90 μm or less. Meanwhile, the lower limit is preferably 50 μm or more.

In the present invention, it is important to control these parameters as described above in the above ranges. Examples of the method of controlling the parameters include: a method that adjusts a kind (degree of saponification, amount of modification, mixing ratio of unmodified PVA/modified PVA, etc.) of the polyvinyl alcohol resin; a method that adjusts an amount of a plasticizer to be added; a method that adds an organic or inorganic filler; a method that adjusts film production conditions (surface temperature of support, heat treatment conditions, drawing conditions, etc.); a method that adjusts uneven shapes on the support surface; a method that adjusts embossing conditions (film moisture content, processing temperature, processing pressure, processing time, etc.); or a method of adjustment by combining the methods described above.

Polyvinyl Alcohol Resin

The water-soluble film of the present invention contains a polyvinyl alcohol resin (PVA).

As the PVA, it is possible to use a polymer produced by saponifying a vinyl ester polymer obtained by polymerizing a vinyl ester monomer.

Examples of the vinyl ester monomer include vinyl formate, vinyl acetate, vinyl propionate, vinyl valerate, vinyl laurate, vinyl stearate, vinyl benzoate, vinyl pivalate, vinyl versatate, and the like. Among them, vinyl acetate is preferred as the vinyl ester monomer.

The vinyl ester polymer is preferably a polymer obtained using only one or more kinds of vinyl ester monomer as the monomer and more preferably a polymer obtained using only one kind of vinyl ester monomer as the monomer. It should be noted that the vinyl ester polymer may be a copolymer of one or more kinds of vinyl ester monomer and another monomer copolymerizable therewith.

Examples of such another monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like.

It should be noted that the vinyl ester polymer may have a structural unit derived from one or more kinds of such another monomer.

From the perspective of increasing both sealing properties and mechanical strength of the water-soluble film, a ratio of the structural unit derived from such another monomer to the vinyl ester polymer (hereinafter, may be referred to as a "degree of modification") is preferably 15 mol % or less based on the number of moles of the total structural units constituting the vinyl ester polymer and more preferably 5 mol % or less.

The degree of polymerization of the PVA is preferably, but not particularly limited to, in a range below. That is, the lower limit of the degree of polymerization is preferably 200 or more from the perspective of securing sufficient mechanical strength of the water-soluble film, more preferably 300 or more, and even more preferably 500 or more. Meanwhile, the upper limit of the degree of polymerization is preferably 8,000 or less from the perspective of increasing productivity of the PVA, productivity of the water-soluble film, and the like, more preferably 5,000 or less, and even more preferably 3,000 or less.

In this context, the degree of polymerization means an average degree of polymerization measured in accordance with the description of JIS K 6726-1994. That is, the degree of polymerization herein is obtained by the following formula from the limiting viscosity [η] (unit: deciliter/g) measured, after saponifying and purifying residual acetic acid groups in the PVA, in water at 30° C.

$$\text{Degree of Polymerization } Po = ([\eta] \times 10^4 / 8.29)^{(1/0.62)}$$

In the present invention, a value obtained by subtracting the degree of modification from the degree of saponification of the PVA is preferably from 64 to 97 mol %. Adjustment of the value in such a range allows achievement of both the sealing properties and the mechanical strength of the water-soluble film. The lower limit of the value is more preferably 70 mol % or more and even more preferably 75 mol % or more. Meanwhile, the upper limit of the value is more preferably 93 mol % or less, even more preferably 91 mol % or less, and particularly preferably 90 mol % or less.

In this context, the degree of saponification of the PVA means a ratio (mol %) indicating the number of moles of the vinyl alcohol units based on the total number of moles of the structural units (typically, vinyl ester monomer units) that may be converted to vinyl alcohol units by saponification and the vinyl alcohol units.

The degree of saponification of the PVA may be measured in accordance with the description of JIS K 6726-1994.

The water-soluble film may contain one kind of PVA singly or may contain two or more kinds of PVA having a degree of polymerization, a degree of saponification, a degree of modification, and the like different from each other.

The upper limit of the PVA content in the water-soluble film is preferably 100 mass % or less. Meanwhile, the lower limit of the PVA content is preferably 50 mass % or more, more preferably 80 mass % or more, and even more preferably 85 mass % or more.

Plasticizer

The water-soluble film preferably contains a plasticizer. The plasticizer thus contained allows impartation of flexibility equivalent to other plastic films to the water-soluble film. The water-soluble film thus has better mechanical strength, such as impact strength, processability during fabrication, and the like.

Examples of the plasticizer include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among them, from the perspective of inhibiting bleeding out on a surface of the water-soluble film, the plasticizer is preferably ethylene glycol or glycerin and more preferably glycerin.

The lower limit of the content of the plasticizer in the water-soluble film is preferably 1 part by mass or more based on 100 parts by mass of the PVA, more preferably 3 parts by mass or more, and even more preferably 5 parts by mass or more. Meanwhile, the upper limit of the content of the plasticizer is preferably 70 parts by mass or less based on 100 parts by mass of the PVA, more preferably 50 parts by mass or less, and even more preferably 40 parts by mass or less. The content of the plasticizer in the above range sufficiently enables an effect of improving the mechanical strength, such as impact strength, in the water-soluble film. It is also possible to preferably prevent or suppress the problems of reducing the handleability, bleeding out on the surface, and the like due to excessive flexibility of the water-soluble film.

Starch/Water-Soluble Polymer

The water-soluble film may contain starch and/or a water-soluble polymer other than PVA. The starch and/or the water-soluble polymer other than PVA thus contained allows impartation of mechanical strength to the water-soluble film, maintenance of moisture resistance of the water-soluble film during handling, or regulation of the rate of flexibilizing the water-soluble film due to water absorption during dissolution.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred.

The content of the starch in the water-soluble film is preferably 15 parts by mass or less based on 100 parts by mass of the PVA and more preferably 10 parts by mass or less. By keeping the content of the starch in the above range, it is possible to prevent or inhibit worsening of the processability of the water-soluble film.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the water-soluble film is preferably 15 parts by mass or less based on 100 parts by mass of the PVA and more preferably 10 parts by mass or less. The content of the water-soluble polymer other than PVA in the above range allows a sufficient increase in the water solubility of the water-soluble film.

Surfactant

The water-soluble film preferably contains a surfactant. The surfactant thus contained allows improvement of the handleability of the water-soluble film and the releasability of the water-soluble film from the film formation apparatus during production.

The surfactant is not particularly limited and, for example, anionic surfactants, nonionic surfactants, and the like may be used.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of these surfactants may be singly used or two or more kinds of them may be used together. Among them, due to an excellent effect of reducing surface irregularities, such as streak defects, during formation of such a water-soluble film and the like, the surfactant is preferably non-ionic surfactants, more preferably alkanolamide-based surfactants, and even more preferably dialkanolamide (e.g., diethanolamide, etc.) of aliphatic carboxylic acid (e.g., saturated or unsaturated aliphatic carboxylic acid having a carbon number from 8 to 30, etc.).

The lower limit of the content of the surfactant in the water-soluble film is preferably 0.01 part by mass or more based on 100 parts by mass of the PVA, more preferably 0.02 parts by mass or more, and even more preferably 0.05 parts by mass or more. Meanwhile, the upper limit of the content of the surfactant is preferably 10 parts by mass or less based on 100 parts by mass of the PVA, more preferably 1 part by mass or less, even more preferably 0.5 parts by mass or less, and particularly preferably 0.3 parts by mass or less. The content of the surfactant in the above range allows better releasability of the water-soluble film from the film formation apparatus during production and causes less problems, such as blocking of the water-soluble films with each other. The problems of bleeding out of the surfactant on a surface of the water-soluble film, deterioration of the appearance of the water-soluble film due to aggregation of the surfactant, and the like are also less likely to occur.

Other Components

In addition to the plasticizer, the starch, the water-soluble polymer other than PVA, and the surfactant, without impairing the effects of the present invention, the water-soluble film may contain components, such as moisture, antioxidants, ultraviolet absorbers, lubricants, cross-linking agents, colorants, fillers, antiseptics, mildewcides, and other polymer compounds.

The ratio of the summed mass of the PVA, the plasticizer, the starch, the water-soluble polymer other than PVA, and the surfactant to the total mass of the water-soluble film is preferably from 60 to 100 mass %, more preferably from 80 to 100 mass %, and even more preferably from 90 to 100 mass %.

Water-Soluble Film

Complete dissolution time of the water-soluble film of the present invention immersed in deionized water at 10° C. is preferably, but not particularly limited to, in a range below. The upper limit of the complete dissolution time is preferably 150 seconds or less, more preferably 90 seconds or less, even more preferably 60 seconds or less, and particularly preferably 45 seconds or less. The water-soluble film having the upper limit of the complete dissolution time in the above range completes the dissolution relatively early and thus is preferably used as a film for packaging (packaging material for) chemicals and the like. Meanwhile, the lower limit of the complete dissolution time is preferably 5 seconds or more, more preferably 10 seconds or more, even more preferably 15 seconds or more, and particularly preferably 20 seconds or more. The water-soluble film having the not excessively short complete dissolution time causes less problems, such as blocking of the water-soluble films with each other and reduction in the mechanical strength due to absorption of moisture in the atmosphere.

The complete dissolution time when the water-soluble film is immersed in deionized water at 10° C. is measured as follows.

<1> The water-soluble film is left in a thermohygrostat conditioned at 20° C.-65% RH for 16 hours or more for humidity control.

<2> A rectangular sample with a length of 40 mm×a width of 35 mm is cut from the humidity controlled water-soluble film and then sandwiched for fixation between two 50 mm×50 mm plastic plates having a rectangular window (hole) with a length of 35 mm×a width 23 mm in a position where the longitudinal direction of the sample is parallel to the longitudinal direction of the window and the window is approximately at the center in the sample width direction.

<3> In a 500 mL beaker, 300 mL of deionized water is put and the water temperature is adjusted at 10° C. while stirring with a magnetic stirrer having a bar with a length of 3 cm at the number of revolutions of 280 rpm.

<4> The sample fixed to the plastic plates in <2> above is fully immersed in the deionized water in the beaker with attention not to contact the bar of the magnetic stirrer.

<5> The time from the immersion in the deionized water to complete disappearance, by visual inspection, of the sample pieces dispersed in the deionized water is measured.

Although complete dissolution time measured by the above method depends on the thickness of the sample, the complete dissolution time herein is defined as the time until a sample in the above size is completely dissolved regardless of the thickness.

The thickness of the water-soluble film is preferably, but not particularly limited to, in a range below. That is, the upper limit of the thickness is preferably 200 μm or less, more preferably 150 μm or less, even more preferably 100 μm or less, and particularly preferably 50 μm or less. Meanwhile, the lower limit of the thickness is preferably 5 μm or more, more preferably 10 μm or more, even more preferably 15 μm or more, and particularly preferably 20 μm or more. The thickness in the above range is not excessively large and thus preferably allows preventing worsening of fabricability of the water-soluble film while it is not excessively small and thus allows securing sufficient mechanical strength of the water-soluble film.

It should be noted that the thickness of the water-soluble film may be obtained as an average value of thicknesses measured at ten arbitrary spots (e.g., ten arbitrary spots on a straight line in the longitudinal direction of the water-soluble film).

Method of Producing Water-Soluble Film

A method of producing the water-soluble film of the present invention is not particularly limited and it is possible to use, for example, a method as below.

Examples of the method include: a film formation method where a solvent, additives, and the like are added to PVA and homogenized to obtain a film forming stock solution to be subjected to casting film formation, wet film formation (discharge into a poor solvent), dry/wet film formation, gel film formation (a method where the film forming stock solution is temporarily cooled to form a gel and then the solvent is extracted and removed), and combination thereof, melt extrusion film formation where the film forming stock solution thus obtained is extruded from a T die or the like using an extruder or the like, inflation molding, and the like. Among them, the method of producing the water-soluble film is preferably casting film formation or melt extrusion film formation. Use of these methods allows a homogeneous water-soluble film to be productively obtained.

A description is given below to a method of producing the water-soluble film using casting film formation or melt extrusion film formation.

A film forming stock solution is prepared at first that contains PVA, a solvent, additives, such as the plasticizer, as needed. It should be noted that, in the case of the film forming stock solution containing the additives, the ratio of the additives to PVA in the film forming stock solution is substantially equal to the above-described ratio of the additives to PVA in the water-soluble film thus obtained.

The film forming stock solution is then casted (fed) in the form of film on a rotating support, such as a metal roll and a metal belt. A liquid coating of the film forming stock solution is thus formed on the support. The liquid coating is heated on the support to remove the solvent and thus solidified to be formed into a film.

The solidified long film is released from the support, dried as needed by a drying roll, a drying furnace, and the like, and further heat treated as needed to be wound in a roll.

The ratio of volatile components (concentration of the volatile components, such as the solvent removed by volatilization and evaporation during film formation and the like) in the film forming stock solution is preferably from 50 to 90 mass % and more preferably from 55 to 80 mass %. The ratio of volatile components in the above range allows adjustment of the viscosity of the film forming stock solution in a preferred range, thereby improving film formability of the water-soluble film (liquid coating) and facilitating production of the water-soluble film with a uniform thickness.

In this context, the "ratio of volatile components in the film forming stock solution" herein means a value obtained by the following formula.

Ratio of Volatile Components in Film Forming Stock Solution (mass %)=$\{(Wa-Wb)/Wa\} \times 100$ In the formula, Wa denotes the mass (g) of the film forming stock solution and Wb denotes the mass (g) of the film forming stock solution after Wa (g) of the solution is dried in an electric heat drier at 105° C. for 16 hours.

Examples of the method of adjusting the film forming stock solution include, but not particularly limited to, a method where PVA and the additives, such as a plasticizer and a surfactant, are dissolved in a dissolution tank or the like, a method where PVA in a hydrated state is melt kneaded together with the additives, such as a plasticizer and a surfactant, using a single- or twin-screw extruder, and the like.

The surface temperature of the support for casting of the film forming stock solution is preferably from 50° C. to 110° C., more preferably from 60° C. to 100° C., and even more preferably from 65° C. to 95° C. The surface temperature in the above range causes drying of the liquid coating to proceed at a moderate rate and thus causes the drying of the liquid coating to take not too long time and thus the productivity of the water-soluble film is not reduced. The drying of the liquid coating proceeding at a moderate rate is less likely to cause irregularities, such as foaming, generated on a surface of the water-soluble film.

Simultaneously with heating of the liquid coating on the support, hot air at a wind velocity from 1 to 10 m/second may be uniformly blown on the entire region on a non-contact surface side of the liquid coating. This allows regulation of the drying rate of the liquid coating. The temperature of the hot air blown on the non-contact surface side is preferably from 50° C. to 150° C. and more preferably from 70° C. to 120° C. The temperature of the hot air in the above range allows a greater increase in the drying efficiency of the liquid coating, uniformity of drying, and the like.

The water-soluble film is preferably dried (solvent removal) to a ratio of volatile components from 5 to 50 mass % on the support and then released from the support and further dried as needed.

Examples of the drying method include, but not particularly limited to, a method including passing through a drying furnace and a method including contacting a drying roll.

In the case of drying the water-soluble film using a plurality of drying rolls, it is preferred that one surface and the other surface of the water-soluble film alternately contact the drying rolls. This allows homogenization of the degree of crystallization of PVA on both surfaces of the water-soluble film. In this case, the number of drying rolls is preferably three or more, more preferably four or more, and even more preferably from 5 to 30.

The temperature of the drying furnace or the drying roll(s) is preferably from 40° C. to 110° C. The upper limit of the temperature of the drying furnace or the drying roll(s) is more preferably 100° C. or less, even more preferably 90° C. or less, and particularly preferably 85° C. or less. Meanwhile, the lower limit of the temperature of the drying furnace or the drying roll(s) is more preferably 45° C. or more and even more preferably 50° C. or more.

The water-soluble film after drying may further be heat treated as needed. The heat treatment allows adjustment of the properties, such as mechanical strength, water solubility, and index of double refraction, of the water-soluble film. The temperature of the heat treatment is preferably from 60° C. to 135° C. The upper limit of the heat treatment temperature is more preferably 130° C. or less.

In order to obtain the water-soluble film with desired surface roughness, it is possible to employ a method that provides unevenness to the support surface to obtain a water-soluble film with uneven shapes during film formation and a method that provides an uneven shape to the water-soluble film by embossing. For example, it is possible to obtain a water-soluble film having intended surface roughness by forming concavities with an average depth of 1.8 μm or less and a maximum depth of 20 μm or more and 50 μm or less on the support surface to contact a surface to be the glossy surface.

In the case of obtaining a water-soluble film with uneven shapes during film formation by providing uneven shapes to the support surface, the film drying temperature is preferably from 50° C. to 170° C. and more preferably from 60° C. to 140° C. The drying time on the support is preferably from 0.5 to 20 minutes and more preferably from 1 to 15 minutes.

In the case of providing an uneven shape to the water-soluble film by embossing, the processing temperature is preferably from 60° C. to 150° C. and more preferably from 80° C. to 140° C. The processing pressure is preferably from 0.1 to 15 MPa and more preferably from 0.3 to 8 MPa. The film feed rate for embossing is preferably 5 m/minute or more and more preferably from 10 to 30 m/minute.

The water-soluble film thus produced is subjected to further humidity control, cutting of both edges (trimmings) of the film, and the like as needed, and then wound in a roll on a cylindrical core and moistureproof packaged to be a product.

Applications

The water-soluble film (water-soluble film) of the present invention is more preferably used in various film applications to which general water-soluble films are applied. Examples of such a film application include packaging films for chemicals, base films for hydraulic transfer printing, base films for embroidery, mold release films for artificial marble molding, packaging films for seeds, films for sanitary container bags, and the like. Among them, the water-soluble film of the present invention is preferably applied to the packaging films for chemicals.

In the case of applying the water-soluble film of the present invention to packaging films for chemicals, examples of the kind of chemical include pesticides, detergents (including bleaches), germicides, and the like.

The properties of the chemicals are not particularly limited and may be acidic, neutral, or alkaline.

The chemicals may contain boron-containing compound(s) and/or halogen-containing compound(s).

The form of the chemicals may be in any of powder, bulk, gel, and liquid. The form of package is preferably, but not particularly limited to, unit packaging to package (preferably, seal package) the chemicals per unit amount from the perspective of handleability.

A package of the present invention is obtained by packaging a chemical by applying the water-soluble film of the present invention to a packaging film for chemicals. In other words, the package of the present invention includes a packaging material (capsule) composed of the water-soluble film of the present invention and a chemical encapsulated in the packaging material.

Production of a package using the water-soluble film of the present invention in such a manner that the mat surface is bonded to each other to place the glossy surface on the front surface side allows a package to be obtained that has excellent surface gloss and has excellent anti-blocking properties.

A method of bonding the film is not particularly limited and it is possible to employ a common method. Examples of the method include heat sealing, water sealing, glue sealing, and the like, and among all, water sealing is preferred.

EXAMPLES

Although the present invention is specifically described below by way of Examples and the like, the present invention is not at all limited by Examples below. It should be noted that, in Examples and Comparative Examples below, evaluation items and methods thereof were used as follows.
(1) Average Height SRc and Maximum Height SRz of Film Surface A water-soluble film was fixed on a slide glass to analyze surface roughness with a laser microscope. From a measured image at 20 times, SRc and SRz in a selected area of 200×200 μm were automatically calculated within an apparatus and respective average values at ten spots were defined as analysis values. The measurement conditions and the calculation conditions in detail were as follows.

Measurement Apparatus: OLS 3100 (manufactured by Olympus Corp.)

Measurement Conditions: manual measurement, pitch of 0.30, step of approximately from 80 to 150 (appropriately regulated depending on sample)

Identification of Minimum Height: profile curve of 10% of Pz, roughness curve of 10% of Rz, waviness curve of 10% of Wz Identification of Minimum Length: 1% of reference length (viewing area on screen)

Load Length Ratio subjected to Cutting Level Difference Calculation: Rmr1 of 30%, Rmr2 of 60%

(2) Glossiness

The water-soluble film was cut into a square sample in size of approximately 5 cm in a film formation direction (MD)×approximately 5 cm in a width direction (TD) and retained in an environment at 23° C.-35% RH for 16 hours or more for humidity control. The glossy surface of the sample after humidity control was subjected to glossiness measurement at angles of 60° in the MD and TD directions to define an average value as the glossiness.

(3) Coefficient of Friction

Figure 1:
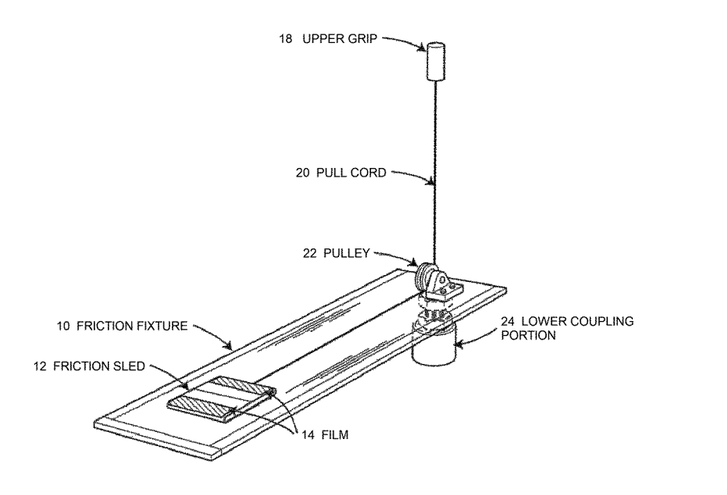
FIG. 1 illustrates an example of a device for measuring a coefficient of friction of a film.

The coefficient of friction of the water-soluble film was measured with a device in FIG. 1 in accordance with ASTM D1894. The film sample was retained in an environment at 23° C.-35% RH for 16 hours or more for humidity control. In this environment, an upper grip 18 and a lower coupling portion 24 were fixed to a tensile tester, and two cut samples were fixed respectively to a surface of a friction fixture 10 and a friction sled 12 in size of 12.7 cm×12.7 cm. The sample was set up in such a manner that the glossy surfaces contacted with each other and the direction of sled movement was parallel to the MD direction. The friction sled 12 was lift up with a pull cord 20 via a pulley 22 to the pulley side. A force to cause the sled to start moving, that is, the first peak of a test force was measured. The measurement was performed three times and a value obtained by dividing the average value by the sled weight was defined as the coefficient of friction.

(4) Water Sealing Strength

The water-soluble films were bonded by water sealing and the sealing strength was measured to evaluate the sealing properties. By changing the sides of the films when bonded, the sealing strength of bonding the glossy surfaces to each other (G-G sealing strength) and the sealing strength of bonding the glossy surface to the mat surface (G-M sealing strength) were respectively measured.

From the water-soluble film, two rectangular samples in size of approximately 30 cm in the film formation direction (MD) ×approximately 10 cm in the width direction (TD) were cut and retained in an environment at 23° C.-35% RH for 16 hours or more for humidity control. In this environment, one of the samples after humidity control was placed on a table and the four corners of the film were fixed with an adhesive tape. The other sample was further overlaid on it and both ends on a 10 cm side were fixed with an adhesive tape, and an unfixed edge was passed through an ESIPROOF proof roller using a 140/10 anilox roller. On a doctor blade of the ESIPROOF proof roller, 0.5 mL of deionized water was poured and the roller was pulled at a rate of approximately 7.5 cm/second to bond the two samples. It should be noted that the roller was not pulled to the edge of the sample an unbonded area was left at the edge of the sample to be set in a fastener of the tensile tester. From the bonded sample, three test pieces in strip were cut that have the long sides of MD and a width of 25 mm.

The test pieces were left for 10 minutes after bonding and set in the tensile tester, and peeled at a tensile speed of 254 mm/minute in accordance with T-peel test based on JIS K6854-3:1999 to define an average value of (three) peeling forces thus obtained as the sealing strength.

Example 1

A film forming stock solution was prepared at first by adding 100 parts by mass of PVA (degree of saponification of 88 mol %, viscosity-average degree of polymerization of 1700) obtained by saponifying polyvinyl acetate, 10 parts by mass of glycerin as the plasticizer, 0.1 part by mass of lauric acid diethanolamide as the surfactant, and water. It should be noted that the ratio of volatile components in the film forming stock solution was 68 mass %.

The film forming stock solution was then discharged in the form of film on a metal roll (surface temperature of 80° C.) as the support from a T die to form a liquid coating on the metal roll. On the metal roll, hot air at 85° C. was blown for drying at a rate of 5 m/second on the entire surface of the liquid coating not in contact with the metal roll. A water-soluble film was thus obtained.

The water-soluble film was then released from the metal roll and dried by alternately contacting one surface and the other surface of the water-soluble film with a plurality of drying rolls (surface temperature of 75° C.). Subsequently, the surface not contacting the metal rolls was subjected to embossing while the film was travelled at a rate of 12 m/minute under the conditions of an emboss roll temperature of 120° C., a backup roll temperature of 50° C., and a linear pressure of 25 kg/cm using an emboss roll having a satin pattern with surface roughness (arithmetic mean roughness Ra) of 3 μm and a backup roll, which is a rubber roll, and then the film was wound on a cylindrical core in a roll. The water-soluble film thus obtained had a thickness of 35 μm.

The water-soluble film thus obtained was subjected to measurement of the surface roughness, the glossiness, the coefficient of friction, and the water sealing strength. The complete dissolution time of the water-soluble film thus obtained immersed in deionized water at 10° C. was measured, and the complete dissolution time was 58 seconds.

Examples 2 and 3 and Comparative Examples 1 and 2

Water-soluble films were obtained in the same manner as in Example 1 except for changing the film thickness and the embossing conditions as shown in Table 1. The water-soluble films thus obtained were subjected to measurement of the surface roughness, the glossiness, the coefficient of friction, and the water sealing strength. The results are shown in Table 1.

As clearly seen from Table 1, the water-soluble film of the present invention had excellent surface gloss and excellent anti-blocking properties.

Use of the water-soluble film of the present invention for a package to contain chemicals and the like allows the package to be obtained to be excellent in anti-blocking properties and to suppress deformation and tear during storage or transport.

REFERENCE SIGNS LIST

10 Friction Fixture
12 Friction Sled
14 Film
18 Upper Grip
20 Pull Cord
22 Pulley
24 Lower Coupling Portion

The invention claimed is:

1. A water-soluble film having a surface roughness, comprising a polyvinyl alcohol resin,
   wherein the water-soluble film has a mat surface and a glossy surface, wherein the glossy surface has an average height SRc(G) of 1.8 μm or less and a maximum height SRz(G) of 20 μm or more and 50 μm or less, and the mat surface has an average height SRc(M) of 1 μm or more and 5 μm or less and a maximum height SRz(M) of 20 μm or more and 80 μm or less, and
   wherein the average heights SRc(G) and SRc(M) and the maximum heights SRz(G) and SRz(M) indicating the surface roughness are measured in a 200 μm×200 μm area of the water-soluble film using a laser microscope.

2. The water-soluble film according to claim 1, wherein a sum {SRc(M)+SRc(G)} of the average height SRc(M) of the mat surface and the average height SRc(G) of the glossy surface is 2 μm or more and 6 μm or less.

3. The water-soluble film according to claim 1, wherein a sum {SRz(M)+SRz(G)} of the maximum height SRz(M) of the mat surface and the maximum height SRz(G) of the glossy surface is 40 μm or more and 100 μm or less.

4. A package comprising the water-soluble film according to claim 1, wherein the water-soluble film contains a chemical.

5. The package according to claim 4, wherein the glossy surface is an outer surface.

6. The package according to claim 4, wherein the chemical is a pesticide, a detergent, or a germicide.

TABLE 1

|  | Example 1 | Example 2 | Example 3 | Comparative Example 1 | Comparative Example 2 |
|---|---|---|---|---|---|
| Film Thickness | 35 | 76 | 76 | 35 | 35 |
| Emboss Roll Temperature | 120 | 120 | 130 | 130 | 110 |
| Emboss Pressure [kg/cm] | 25 | 30 | 30 | 35 | 25 |
| Line Speed | 12 | 15 | 15 | 10 | 15 |
| SRc(G) | 1.5 | 0.8 | 1.7 | 2.7 | 1.1 |
| SRz(G) | 30 | 29 | 32 | 33 | 19 |
| SRc(M) | 3.2 | 3.4 | 5.2 | 3.7 | 1.3 |
| SRz(M) | 50 | 36 | 78 | 48 | 29 |
| SRc(G) + SRc(M) | 4.7 | 4.2 | 6.9 | 6.4 | 2.4 |
| SRz(G) + SRz(M) | 80 | 65 | 110 | 81 | 48 |
| G Glossiness | 57 | 63 | 54 | 26 | 65 |
| G-G Coefficient of Friction | 0.75 | 0.82 | 0.57 | 0.57 | 3.83 |
| G-M Sealing Strength | 14.8 | 16.5 | 8.2 | 9.4 | 26.3 |
| M-M Sealing Strength | 12.5 | 11.1 | 3.7 | 10.2 | 28.5 |

7. The water-soluble film according to claim 1, wherein the water-soluble film has a complete dissolution time of 5 to 150 seconds in deionized water at 10° C.

8. The water-soluble film according to claim 1, wherein the polyvinyl alcohol resin has a degree of saponification of from 64 to 97 mol %.

9. The water-soluble film according to claim 1, wherein the polyvinyl alcohol resin has a degree of saponification of from 75 to 93 mol %.

10. The water-soluble film according to claim 1, wherein the polyvinyl alcohol resin has a viscosity-average degree of polymerization of 200 to 8,000.

11. The water-soluble film according to claim 1, wherein the polyvinyl alcohol resin has a viscosity-average degree of polymerization of 500 to 3,000.

12. The water-soluble film according to claim 1, wherein the polyvinyl alcohol resin is obtained from a vinyl ester polymer formed from only a vinyl ester.

13. The water-soluble film according to claim 12, wherein the vinyl ester is vinyl acetate.

14. The water-soluble film according to claim 1, further comprising a plasticizer.

15. The water-soluble film according to claim 14, comprising, based on 100 parts by mass of the polyvinyl alcohol resin, 1 part by mass or more to 70 parts by mass or less of the plasticizer.

16. The water-soluble film according to claim 15, wherein the plasticizer includes glycerin.

17. The water-soluble film according to claim 1, further comprising a surfactant.

18. The water-soluble film according to claim 17, comprising, based on 100 parts by mass of the polyvinyl alcohol resin, 0.01 part by mass or more to 10 parts by mass or less of the surfactant.

19. The water-soluble film according to claim 18, wherein the surfactant includes lauric acid diethanolamide.

20. The water-soluble film according to claim 1, wherein the water-soluble film is formed by embossing the water-soluble film on an emboss roll with a surface roughness, Ra, of 3 μm.

* * * * *